(12) United States Patent
Antoniou

(10) Patent No.: US 12,171,194 B2
(45) Date of Patent: Dec. 24, 2024

(54) ANTI-ATTACK SHOCK COLLAR

(71) Applicant: Peter Antoniou, Potters Bar (GB)

(72) Inventor: Peter Antoniou, Potters Bar (GB)

( * ) Notice: Subject to any disclaimer, the term of this patent is extended or adjusted under 35 U.S.C. 154(b) by 130 days.

(21) Appl. No.: 17/756,922

(22) PCT Filed: Dec. 17, 2020

(86) PCT No.: PCT/GB2020/053265
§ 371 (c)(1),
(2) Date: Jun. 6, 2022

(87) PCT Pub. No.: WO2021/123791
PCT Pub. Date: Jun. 24, 2021

(65) Prior Publication Data
US 2023/0008166 A1    Jan. 12, 2023

(30) Foreign Application Priority Data
Dec. 20, 2019   (GB) ...................................... 1918940

(51) Int. Cl.
*A01K 27/00*    (2006.01)

(52) U.S. Cl.
CPC .......... *A01K 27/009* (2013.01); *A01K 27/006* (2013.01)

(58) Field of Classification Search
CPC ............................. A01K 27/009; A01M 29/24
USPC ................................................ 119/850, 855
See application file for complete search history.

(56) References Cited

U.S. PATENT DOCUMENTS

| | | | | |
|---|---|---|---|---|
| 718,896 | A | * | 1/1903 | Ames et al. ............... A61F 7/00 607/112 |
| 4,153,009 | A | * | 5/1979 | Boyle .................. A01K 13/007 119/908 |
| 5,799,618 | A | * | 9/1998 | Van Curen ........... A01K 15/023 119/908 |

(Continued)

FOREIGN PATENT DOCUMENTS

| | | | | |
|---|---|---|---|---|
| AU | 2015346021 | A1 * | 4/2017 | ........... A01K 11/008 |
| CH | 712090 | A2 * | 8/2017 | ............ A01M 29/10 |

(Continued)

OTHER PUBLICATIONS

Merged translation of SE-524365-C2 (Year: 2004).*
(Continued)

*Primary Examiner* — Morgan T Jordan
(74) *Attorney, Agent, or Firm* — Wong Meyer Smith & McConnell

(57) ABSTRACT

An anti-attack shock collar is a collar for an animal. The anti-shock collar includes an electronics unit; a power supply operable to create a potential difference between a first and a second terminal; at least one flexible strap secured at one position along its length to the electronics unit; and a water sensor. The flexible strap includes first and second electrodes which are exposed or partially exposed on the exterior of the collar and are electrically connected to the first and second terminals of the power supply respectively. The water sensor detects the presence of water on a portion of the collar. If water is detected on the portion of the collar, the water sensor causes the electronics unit to prevent the power supply from being operated to create a potential difference between the first and second electrodes.

18 Claims, 5 Drawing Sheets

(56) References Cited

U.S. PATENT DOCUMENTS

| | | | | | |
|---|---|---|---|---|---|
| 5,934,225 | A | * | 8/1999 | Williams | A01K 27/009 119/859 |
| 6,327,999 | B1 | * | 12/2001 | Gerig | A01K 15/021 119/712 |
| 6,487,992 | B1 | * | 12/2002 | Hollis | A01K 15/022 119/712 |
| 6,581,546 | B1 | * | 6/2003 | Dalland | A01K 15/023 119/712 |
| 2001/0035134 | A1 | * | 11/2001 | Stapelfeld | A01K 15/023 119/720 |
| 2009/0272335 | A1 | * | 11/2009 | Cooke, Jr. | A01K 13/006 119/822 |
| 2009/0272336 | A1 | * | 11/2009 | Cooke, Jr. | A61D 9/00 119/850 |
| 2009/0272337 | A1 | * | 11/2009 | Pomponio | A01K 13/006 219/211 |
| 2009/0272338 | A1 | * | 11/2009 | Cooke, Jr. | A01K 13/006 119/850 |
| 2010/0139575 | A1 | * | 6/2010 | Duncan | A01K 15/021 340/573.3 |
| 2011/0174235 | A1 | * | 7/2011 | Vinano | A01K 79/02 119/712 |
| 2012/0196056 | A1 | * | 8/2012 | Fox | A61D 9/00 428/40.1 |
| 2015/0313182 | A1 | * | 11/2015 | Overman | A01K 27/006 119/850 |
| 2015/0334991 | A1 | | 11/2015 | Foley | |
| 2018/0128580 | A1 | | 5/2018 | Pasley et al. | |
| 2019/0133084 | A1 | | 5/2019 | Landers et al. | |
| 2019/0281794 | A1 | * | 9/2019 | Ehrman | A01K 27/009 |
| 2020/0296928 | A1 | * | 9/2020 | Mott | A01K 13/006 |

FOREIGN PATENT DOCUMENTS

| | | | | | |
|---|---|---|---|---|---|
| DE | 20015743 | U1 | * | 12/2000 | A01K 27/009 |
| DE | 202004011942 | U1 | | 12/2004 | |
| DE | 202009013451 | U1 | * | 4/2010 | A01K 13/006 |
| DE | 202010010201 | U1 | * | 10/2010 | A01K 27/006 |
| NL | 1042347 | B1 | | 10/2018 | |
| SE | 524365 | C2 | * | 7/2004 | A01K 13/006 |
| SE | 201100408 | A1 | * | 11/2012 | A01K 13/006 |
| WO | WO-2005104885 | A1 | * | 11/2005 | A01K 13/006 |

OTHER PUBLICATIONS

Merged translation of WO-2005104885-A1 (Year: 2005).*
Merged translation of DE-202009013451-U1 (Year: 2010).*
Merged translation of DE-202010010201-U1 (Year: 2010).*
Merged translation of SE-201100408-A1 (Year: 2012).*
Merged translation of CH-712090-A2 (Year: 2017).*
Merged translation of AU_2015346021 (Year: 2017).*

* cited by examiner

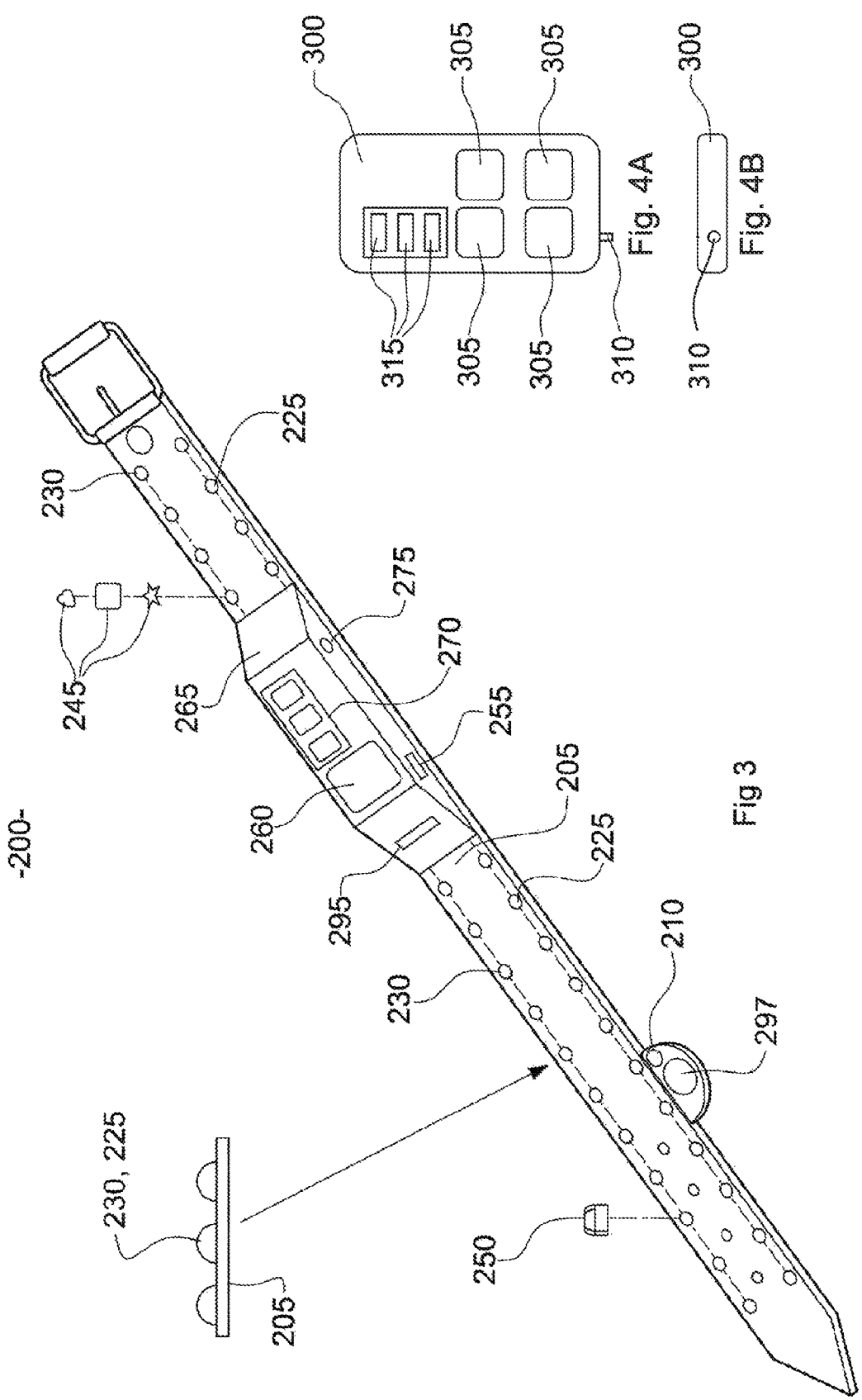

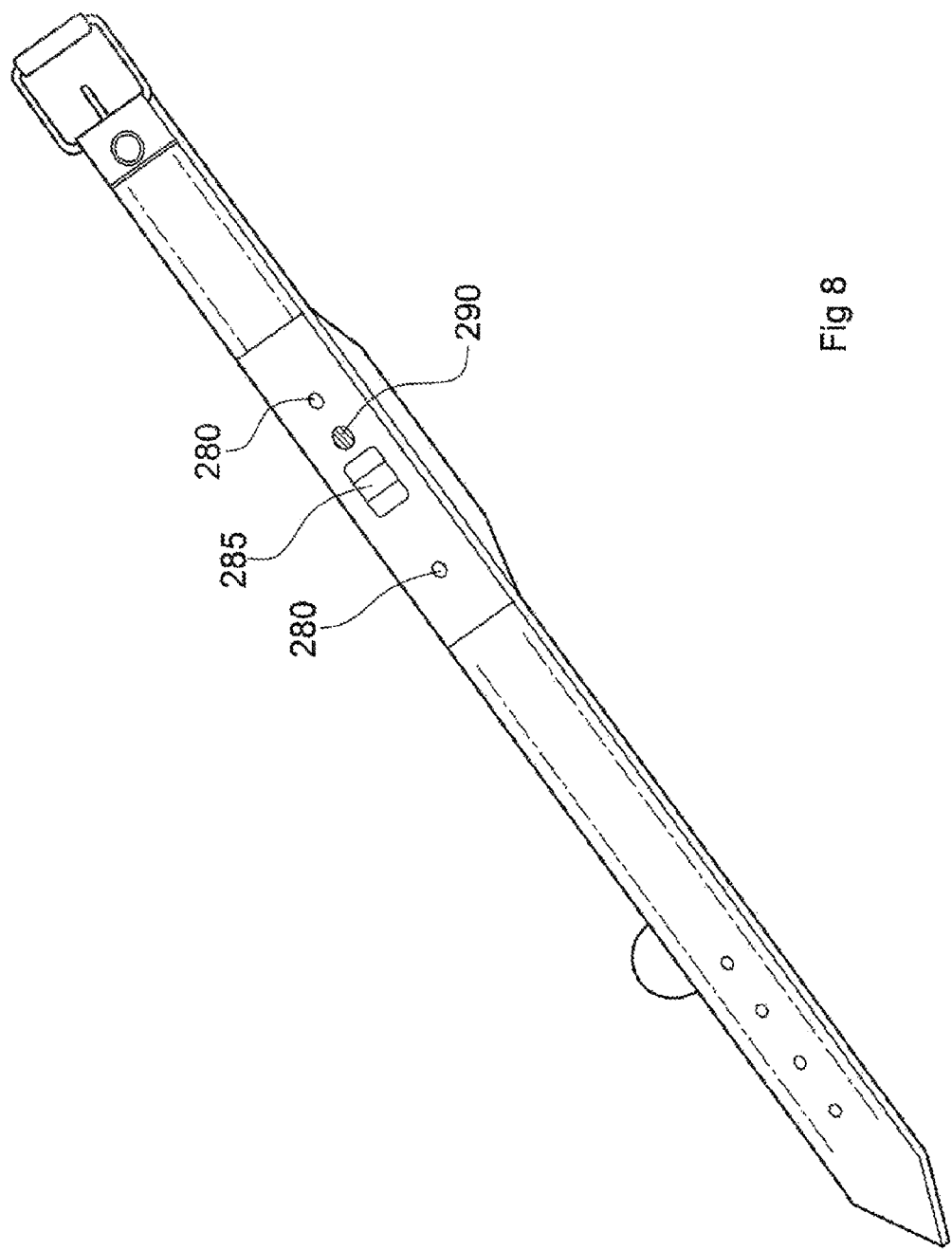

ANTI-ATTACK SHOCK COLLAR

FIELD OF THE INVENTION

This invention relates generally to devices for stopping attacks upon animals by other animals, and specifically to a collar for delivering an electric shock to a dog other than a dog wearing the collar in order to stop an attack upon the dog wearing the collar.

BACKGROUND

Dogs are popular pets which require regular exercise. Dog owners typically exercise their dogs outdoors in public spaces that other dog owners are likely to frequent. Dogs may react unpredictably to unknown people or dogs, so a dog owner may fear an attack upon his or her dog when the dog is exercised, especially when the dog is a smaller or more vulnerable breed.

In the event of a dog attack either dog may be injured or killed. Furthermore, if either dog owner attempts to physically intervene during a dog attack, the owner may also be attacked and come to harm. Further, one of the dogs may be put down in the aftermath of the attack.

It is therefore desirable to stop attacks by dogs upon other dogs before either dog can injure the other and before either owner is tempted to physically intervene.

It is common in dog attacks for an attacking dog to aim to bite the throat of the attacked dog, so some known devices for stopping dog attacks are collars, such as the collar of DE 200 15 743 U1. When this collar is worn by a dog, electrodes facing away from the dog may be exposed on the outside of this collar during a dog attack. These electrodes can be connected to a high voltage power supply. An attacking dog aiming to bite the throat of a dog wearing this collar may then touch electrodes which are connected to different terminals of the power supply, completing an electric circuit and delivering a shock to the attacking dog. This shock may discourage the attacking dog from continuing to attack, potentially preventing a serious or fatal injury to either of the dogs or the owners, and also reducing the likelihood that either dog will be euthanized. So, while unpleasant for the attacking dog, this shock may lead to an outcome which is preferable for both of the dogs and their owners.

It is an object of the invention to provide an improved collar of this type.

SUMMARY OF INVENTION

Accordingly, one aspect of the present invention provides a collar for an animal, the collar comprising: an electronics unit; a power supply operable to create a potential difference between a first and second terminal; at least one flexible strap secured at one position along its length to the electronics unit, having opposing ends which are releasably fastenable to each other to form a closed loop, and comprising first and second electrodes which are exposed or partially exposed on the exterior of the collar and are electrically connected to the first and second terminals of the power supply respectively; and a water sensor configured to detect the presence of water on a portion of the collar and, if water is detected on the portion of the collar cause the electronics unit to prevent the power supply from being operated to create a potential difference between the first and second electrodes.

Preferably, wherein the water sensor detects the presence of water by measuring the resistance between two electrical contacts. Even more preferably, wherein the two electrical contacts of the water sensor are positioned on the interior of the collar.

Advantageously, wherein the power supply includes a rechargeable battery and the electronics unit includes a digital display which displays the remaining battery charge.

Conveniently, wherein the collar includes an LED. Even more conveniently, wherein the LED is incorporated into the flexible strap, or wherein the LED is incorporated into the electronics unit. Preferably, wherein the electronics unit includes a magnetic switch, which can be used to switch the collar between a standby mode in which current is flowing through the electronics unit, and an "off" mode in which no current is flowing through the electronics unit. Preferably, wherein the LED is configured to generate light when the collar is in a standby mode.

Conveniently, wherein the LED is configured to flash when the power supply is generating a potential difference between the terminals.

Advantageously, wherein the LED is operable to be switched to a night light mode, in which the intensity of the light produced by the LED is increased. Even more advantageously, wherein the light emitted by the LED in night light mode is of a different colour than when operating in any other mode.

Preferably, wherein each terminal of the power supply is connected to a plurality of electrodes in the flexible strap.

Conveniently, wherein the collar further comprises a digital camera which is configured to transmit video data or to record video to a data storage device.

Advantageously, wherein the collar includes wireless communications equipment.

Preferably, wherein the electronics unit also includes a disarm timer which causes the power supply to stop creating a potential difference between the first and second electrode once a configured time has elapsed after the power supply has begun to create a potential difference between the first and second electrode.

Conveniently, wherein the electronics unit contains the power supply.

Another aspect of the invention is an anti-attack system for an animal, the anti-attack system comprising: a collar according to the previous aspect of the invention and further comprising a receiver; and a remote control comprising a transmitter operable to transmit a signal; wherein upon receipt of a signal transmitted by the transmitter of the remote control by the receiver, the collar is configured to enter a state in which it creates a potential difference between the first and second electrodes, from a state in which it does not create a potential difference between the electrodes.

Preferably, where the collar includes an LED which is operable to be switched to a night light mode, in which the intensity of the light produced by the LED is increased, wherein the remote control is further operable to transmit a second signal, wherein, upon receipt of the second signal by the transmitter, the collar enters the night light mode if not in the night light mode, and leaves the night light mode if already in the night light mode.

Conveniently, wherein the power supply is operable to switch the potential difference being maintained between the terminals between a plurality of preconfigured potential differences. Even more conveniently, wherein the preconfigured potential differences include 800 Volts, 2000 Volts, and 4000 Volts and/or wherein the collar is configured to cycle through the plurality of preconfigured potential differences between the electrodes upon receiving the signal of claim 18 while the collar is maintaining a non-zero potential difference between the first and second electrodes.

Advantageously, wherein the electronics unit of the collar includes a magnetic switch, which can be used to switch the collar between a standby mode in which current is flowing through the electronics unit, and an "off" mode in which no current is flowing through the electronics unit, and wherein the remote controller further comprises a magnet suitable to change the state of the magnetic switch.

BRIEF DESCRIPTION OF THE FIGURES

FIG. 3 shows an alternative collar in accordance with the invention.

FIG. 4A shows a planar view of a remote control in accordance with aspects of the invention.

FIG. 4B shows an end view of the remote control of FIG. 4A in accordance with aspects of the invention.

FIG. 8 is a rear view of the collar of FIG. 3.

DETAILED DESCRIPTION OF THE INVENTION

Figure 1:
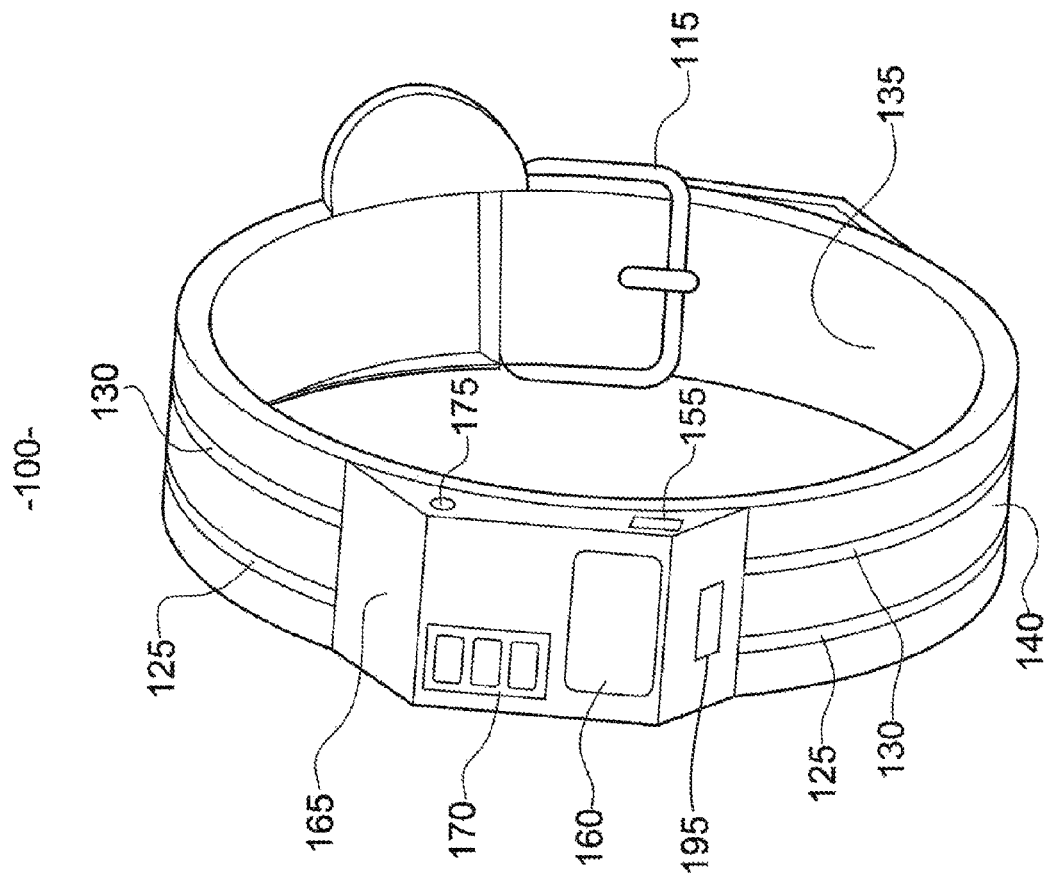
FIG. 1 shows an exemplary collar.

FIG. 1 depicts a collar 100 in accordance with aspects of the invention, which comprises an electronics unit 165, a flexible strap 105, a power supply, and a water sensor. The collar of FIG. 1 may be incorporated into an anti-attack system in accordance with further aspects of this invention, the anti-attack system may comprise the collar 100 of FIG. 1, which additionally includes a receiver, and a remote control 300 as depicted in FIGS. 4A and 4B, which includes a transmitter.

FIG. 3 depicts a collar 200 in accordance with aspects of the invention, which also comprises an electronics unit 265, a flexible strap 205, a power supply, and a pair of water sensors.

FIG. 8 depicts the inside of collar 200, showing the pair of water sensors 280.

Figure 2:
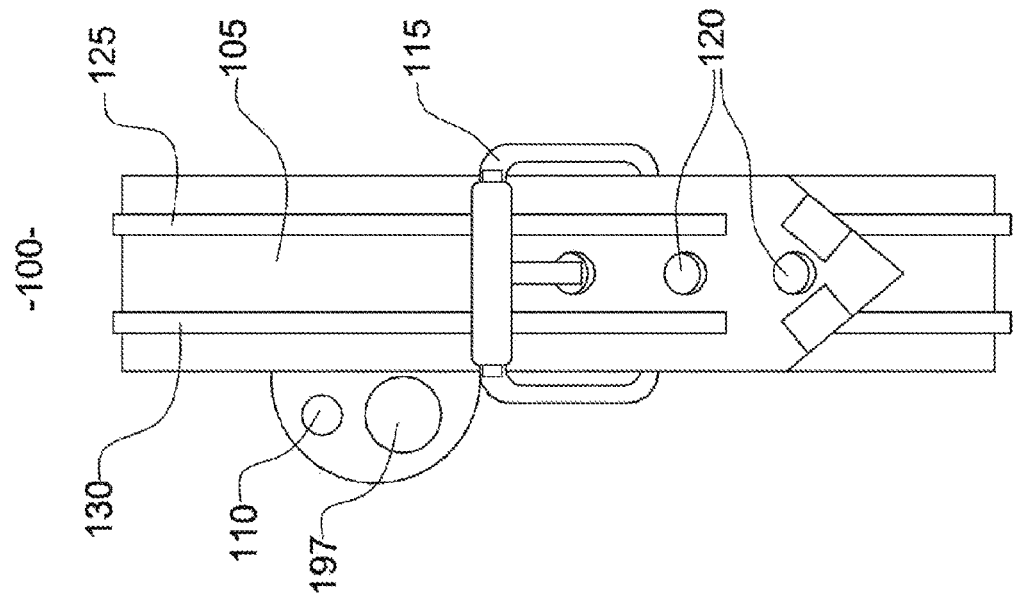
FIG. 2 is a rear view of the collar of FIG. 1.

The flexible strap 105 of FIG. 1 may serve to secure the collar to an animal wearing the collar (the wearing animal), and to deliver a shock to an animal attacking the wearing animal (the attacking animal). A back view of the collar 100 of FIG. 1 is depicted in FIG. 2, it can be seen from this figure that flexible strap 105 may comprise one or more LEDs 110. In preferred embodiments these LEDs, or other light sources, may be configured to indicate the status of the collar, increase the visibility of the collar, or illuminate the surroundings of the collar.

The flexible strap 105 of FIG. 1 comprises a strip of material. This strip of material has a length measured along an axis parallel to its longest edge, a thickness measured along an axis normal to its largest face, and a width measured along an axis perpendicular to the length and thickness. The strip has two sides separated by the thickness of the strip, a first, inner side 135 being in contact with the wearing animal's neck when in a worn configuration, and a second, outer side 140 which faces away from the wearing animal's neck when in a worn configuration. The strip has two ends separated by its length. At two or more positions along the length of the strip fastening means are provided 115, 120. The exemplary strap of FIGS. 1 and 2 comprises a buckle 115 provided at one end of the strip, and loops 120 provided further along the strip, allowing the buckle 115 to be releasably fastened to one of the loops 120, forming the strip into a loop. Alternative fastening means may be used, such as hook and loop fasteners, or any other suitable fastening mechanism. The strip may be formed of any suitable insulating material or combination of materials, such as leather, textiles formed from natural fibres or polymers such as polyester, or polymers which have not been formed into textiles. The skilled reader will recognise that these are known features of an animal collar.

The outer side 140 of the strap 105 of FIG. 1 includes two electrodes 125, 130. FIGS. 3 and 8 show another collar which embodies the invention. In this collar the two electrodes are be replaced by groups of electrodes 225, 230. Generally the strap of the invention comprises two groups of electrodes 125, 130, 225, 230 where each group of electrodes may comprise one or more electrodes. These electrodes 125, 130, 225, 230 may be formed of a suitable conductive material. It may also be desirable for these electrodes 125, 130, 225, 230 to be non-toxic and resistant to corrosion. Suitable materials include brass and stainless steel. The electrodes may also be coated. At least a portion of each of these electrodes 125, 130, 225, 230 is exposed on the exterior of the strap 105, 205. These electrodes 125, 130, 225, 230 may be positioned around the collar so that an attacking animal trying to bite the neck of an animal wearing the collar will contact an electrode from each group of electrodes 125, 130, 225, 230. In the embodiment of FIGS. 1 and 2 each group of electrodes 125, 130 comprises only one electrode and these electrodes take the form of spaced apart rails, where each electrode is flexible and extends along a substantial portion of the length of the flexible strap. In alternative embodiments, each group of electrodes may comprise multiple electrodes. The embodiment of FIGS. 3 and 8 is a collar in which each group of electrodes 225, 230 is arranged in a separate row which extends along the length of collar. It is also contemplated that the groups of electrodes may be arranged in other ways, for example, each group of electrodes may be arranged in the same row, with every second electrode being part of the same group, or the groups of electrodes may be arranged in a chequerboard pattern, or in any other arrangement in which an attacking animal is likely to contact at least one electrode from each group when trying to bite the neck of a wearing animal.

Now considering the embodiment of FIGS. 3 and 8, the sizes and shapes of the electrodes 225, 230 may be chosen so that they are unlikely to part the hair of the wearing animal or another non-hostile animal and contact the skin beneath. The dimensions of the electrodes may be chosen so that the electrodes 225, 230 do not protrude far above the collar, no more than 5 mm for example. Additionally or alternatively, the shape of the electrodes 225, 230 may be chosen so that they are unlikely to part hair. For example, sharp edges or sheer faces could be avoided in the design of the electrodes. As a result, even if a large potential difference is being maintained between the electrodes 225, 230 of the different groups, an animal would be unlikely to be shocked by the collar unless it is aiming to bite the collar or the neck beneath, as dog's and most other animals which will be in close proximity to a dog are almost entirely covered in insulating hair. The mouth of an animal is often one of the few places on its body with exposed skin, so an attacking animal is likely to be shocked if it attempts to bite the neck of the wearing animal. This electrode design would also make the collar unsuitable for misuse as an electronic training collar, as the electrodes of such devices must be relatively long and narrow to part the hair of a dogs dog's neck to deliver a shock to the skin.

The shapes of the electrodes may also be chosen for aesthetic effect. FIG. 3 shows alternative electrodes 245 having different shapes, including heart shapes, star shapes, and square shapes, which may replace the electrodes 230, 225 of FIG. 3. One or more electrodes 230, 225 may also be replaced with an electrode 250 that includes a conductive bezel, into which ornamental stones can be set. For example, precious, semi-precious, or artificial stones or gemstones may be set into the bezel of an electrode. Other non-conductive ornamentation may be set into the bezels, such as polymer imitations of gemstones or amber. The electrodes 230, 225 may be replaceable by a user, allowing the user to customise of the appearance of the collar. It is also contemplated that, additionally or alternatively, the entire strap 105, 205 may be replaceable by the end user. This may allow the end user to quickly and conveniently replace the entire set of electrodes, and allows the user to customise the appearance of other elements of the strap. A replaceable strap also allows the user to change the length of the strap. This allows the collar to better fit dogs of different sizes.

A component that is replaceable by a user is a component replaceable by a person having no specialist tools or skills. For example, the flexible strap 105, 205 may be replaceable by unscrewing screws which secure the strap to the electronics unit.

Conductive material may be embedded in the strips of flexible straps 105 205 of embodiments of the invention to allow current to flow from the power supply to each electrode of each group of electrodes 125, 130, 225, 230. A separate wire (or another suitable flexible conductor) may be embedded in the strip of the flexible strap to transfer current to each group of electrodes.

Further conductors may be embedded in the strip of the flexible strap to transfer current to an LED 110, 210 or other light source located on the strip of the flexible strap.

Conductors may be embedded in the strip by placing the conductors between different pieces of strip material, and fusing these pieces around the conductors. This may be done using adhesives or any other suitable method for bonding pieces of strip material. The skilled reader would recognise that further conductors could be embedded in the strip in a similar way as necessary to transfer current or data through the flexible strap.

Collars in accordance with the invention incorporate a power supply, which serves to generate the shock delivered by the electrodes 125, 130, 225, 230, and may additionally provide power to other electronic components.

The power supply is operable to create a potential difference between two terminals. The potential difference generated between the terminals may be in the range 800-4000V, or may be one of a group of preconfigured values, such as 800V, 2000V, or 4000V. The power supply may be operable to generate any one of the above potential differences, and switch between generating the above potential differences, and may be operable to produce a potential difference in the above range, and switch between different potential differences in the above range of potential differences.

Each terminal of the power supply may be connected to a different group of electrodes 125, 130, 225, 230, for example via one or more flexible conductors embedded in the flexible strap 105, 205.

The power supply may store energy in a battery which may also be rechargeable. This battery may be a lithium ion battery, lithium polymer battery, nickel metal hydride battery, or another suitable battery. The collar may include a charging port 155, 255 which accepts a standard connector, such as USB type C, micro USB, or another suitable connector. The other end of a suitable connector may be connected to mains power, a battery, or another device and used to charge the rechargeable battery of the power supply.

The DC current provided by the battery may be converted to high voltage power using a suitable high voltage power supply, which may supply high voltage AC or DC current. For example, the power supply may include a transformer to increase the voltage of an alternating current, and additionally or alternatively may include a voltage multiplier circuit, The power supply may alternatively be a switched mode power supply, capable of producing high voltage DC current directly.

The power supply may store charge in a capacitor, so that a shock of the desired voltage can be delivered rapidly. Charge stored over time in a capacitor can be discharged quickly, meaning that a power supply which cannot produce large sustained currents can deliver large currents over short periods if a capacitor is incorporated into the power supply.

The battery of the power supply may also deliver power to the other components of the collar.

The electronics unit 165, 265 is a casing which may house sensitive electronics such as microcontrollers and other logic devices to protect them from damage. The electronics unit 165, 265 may also be waterproof to protect these components from water damage. The electronics unit may be secured to the casing using screws which may be replaced by a user using a conventional screwdriver. Alternatively, more permanent attachment means may be used, such as rivets.

In the embodiments of the FIGS. 1 2 3 and 8 the power supply is located within the casing of the electronics unit 165, 265. The power supply or portions of the power supply may alternatively be located on another portion of the collar, and connected to components in the electronics unit.

Collars 100, 200 in accordance with the invention may operate in several modes. The collar may be switched from an off state, in which the collar 100, 200 is not powered, to a standby state, in which the collar is powered and may be instructed to operate in further states. When operating in the standby state, the collar 100, 200 may be instructed to enter an armed state. In an armed state a potential difference is maintained between the electrodes 125, 130, 225, 230 of different groups, and an attacking animal which contacts an electrode 125, 130, 225, 230 from each group on a suitably conductive portion of its body will be shocked. The collar 100, 200 may have more than one armed state, and the collar may produce a different potential difference between the groups of electrodes 125, 130, 225, 230 in each different armed state. The collar 100, 200 may be configured to enter a first armed state from the standby state when receiving a first instruction (an arming instruction). The collar 100, 200 may be configured to enter a second armed state from the first armed state when receiving the arming instruction while in the first armed state. Similarly, the collar 100, 200 may be configured to switch to further armed states when receiving the arming instruction in different armed states. The collar 100, 200 may switch back to the first armed state when receiving the arming instruction in a final armed state. In preferred embodiments the collar 100, 200 has three armed states, and repeated receipt of the arming instruction causes the collar 100, 200 to cycle through these three armed states. It is also preferable for each armed state to cause a more intense shock than the previous state, for example the first, second, and third armed states may cause voltages of 800V, 2000V, and 4000V to be generated between the terminals respectively. This allows the level of shock to be tailored to the size of the attacking animal. Receipt of a second instruction (a disarming instruction) may cause the collar 100, 200 to enter the standby state.

One or more of the strap 105, 205 and electronics unit 165, 265 may comprise one or more LEDs 110, 160, 210, 260 which may serve to provide an indication of the status of the collar 100, 200 and/or to show the location of the collar 100, 200. In preferred embodiments both the electronics unit 165 265 and strap 105, 205 comprise at least one LED 110, 160, 210, 260. The collar 100, 200 may be configured to deliver current to LEDs 110, 160, 210, 260, either constantly to cause constant emission of light, or periodically to cause flashing. The collar 100, 200 may be configured to cause constant or periodic light emission whenever it is turned on. The collar 100, 200 may be configured to cause constant light emission while the collar 100, 200 is in standby mode, and configured to cause flashing while the collar 100, 200 is armed. The collar 100, 200 may be configured to increase or decrease the frequency at which the LEDs 110, 160, 210, 260 flash depending on which armed state the collar 100, 200 is in, for example, the frequency of flashing may be increased when the collar 100, 200 is armed to generate higher voltage differences. The LED or LEDs 110, 160, 210, 260 may be groups of LEDs, configured to emit light of one colour when the collar is in standby mode, and of another colour when the collar 100, 200 is armed.

The collar may also be instructed to enter a further state (a night light state) by a third instruction (a light instruction). In this further state, the LEDs 110, 160, 210, 260 may be configured to emit light of another colour. The LEDs 110, 160, 210, 260 may additionally or alternatively be configured to emit light at a greater intensity. In preferred embodiments, the light produced in the night light state may be substantially white. This night light mode may be particularly useful when this collar is worn by a dog. Dogs are often smaller, faster, and more inquisitive than their owners, so a dog owner may lose track of their dog if they let it off its lead. This can be frustrating, especially if this occurs in poor lighting. The night light state allows a dog owner to locate their dog more easily.

The LEDs 110, 160, 210, 260 which operate in the standby, armed, and night light states may be the same LEDs or they may be different, dedicated LEDs.

The collar may be configured to leave the armed state and enter the standby state after a preconfigured time has elapsed in the armed state. This may be 30 seconds, a minute, 4 minutes or another suitable timeframe which is generally longer than the duration of a potential animal attack. Using earlier designs of collar may also allow a dog owner to forget that the dog collar is armed. This will reduce the battery life of the collar, and could result in an accidental shock to the dog owner, the dog, another animal, or another person. The disarm timer reduces the time in which an accidental shock could occur, so reduces the chance that this collar will deliver an accidental shock.

The collar 100, 200 comprises a pair of water sensors 280, shown in FIG. 8. In other embodiments the water sensors 280 may be replaced by a single water sensor. The water sensors 280 may measure the resistance between two electrical contacts to determine whether water is present. Water may provide a path for electrical current to flow between the contacts, so if water is present, the resistance between the contacts may be reduced. If the resistance is low, suggesting the presence of water, the collar may be configured not to enter the armed state. The water sensors 280 may detect water on the inside of the collar 135, for example, electrical contacts may be located inside the collar 135, and the resistance between these contacts may be measured. The collar 100, 200 may also be configured to enter an "off" state when the water sensors 280 detect water. The "off" state is described in more detail below.

If a collar 100, 200 is armed while the collar 100, 200 or dog wearing the collar is wet, particularly If the inside of the collar 135 is wet, water on the collar or dog may create a path for electric current to flow through the dog, shocking the dog and causing the dog distress. The water sensors prevent the collar 100, 200 from being armed while the dog is wet, preventing the dog from being shocked.

The collars 100, 200 of FIGS. 1, 2, 3 and 8 comprise a battery level display 170, 270. This display may be incorporated into the surface of the electronics unit 165, 265, or located behind a transparent window in the electronics unit 165, 265. The display 170, 270 may be a digital display. Methods of representing battery levels on digital displays are well known to the skilled person. In a preferred embodiment the display 170, 270 comprises multiple LEDs or other light sources. The illumination of an individual light source may represent a battery level within a particular range, or the number of illuminated LEDs may represent the approximate battery level.

FIGS. 4A and 4B depict a remote 300 which may be incorporated into an anti-attack system in accordance with further aspects of the invention. The anti-attack system further comprises a collar 100, 200 in accordance with the previously described aspect of the invention, which further comprises a receiver.

The remote 300 comprises a transmitter capable of transmitting instructions to the collar. These instructions may be the arming instruction, the disarming instruction, or the light instruction. The remote may comprise a battery to power the transmitter.

The remote control 300 of FIGS. 4A and 4B comprises a pin 310, which may be configured to fit into a recess 175, 275 in the collar of FIGS. 1 and 2 or 3 and 8. The recess may contain a mechanical switch. In preferred embodiments the remote additionally or alternatively comprises a magnet, which may operate a magnetic switch in the dog collar. The magnetic switch could for example be a reed switch, which brings two electrical contacts together in the presence of a magnetic field. Other designs of magnetic switches may be used. A mechanical or magnetic switch in the dog collar may be configured to switch the collar from any state to an "off" state and from an "off" state to the standby state. In an "off" state no current flows through the collar, conserving battery life.

The transmitter may transmit signals using electromagnetic radiation at a suitable wavelength, such as a license free portion of the radio spectrum. In preferred embodiments the transmitter and receiver are able to communicate at distances of over 150 m. The transmitter may transmit different signals depending on the instruction that the transmitter is sending. The remote 300 may comprise buttons 305 which may be operated to deliver instructions to the collar 100, 200 and may correspond to each instruction that the collar 100, 200 may receive.

The receiver that the collar 100, 200 may comprise may be suitable to receive the signals emitted by the transmitter, and instruct the collar to change states in accordance with the received signal.

In preferred embodiments, the remote includes a display which shows whether the collar 100, 200 is in an armed state, and which armed state the remote is in. For example, the remote control 300 of FIGS. 4A and 4B has three lights 315 which indicate the armed state of the collar. Each light 315 may be lit separately and correspond to an armed state, or the number of lights which are lit may correspond to an armed state, for example one lit light 315 may correspond to an 800V shock, two lights may correspond to a 2000V shock, and 3 lights may correspond to a 4000V shock. The collar 100, 200 and remote may be configured to communicate both ways in order to accurately display the shock level of the collar on the remote.

The remote 300 may also include a display which shows the battery level of the remote and/or the battery level of the collar. The battery level of the remote and/or collar may be represented using multiple LED lights, or the remote may include a digital display which shows a representation of the battery level. In order to display the battery level of the collar on the remote, the collar and remote may be configured to communicate both ways.

The collar 100, 200 may comprise wireless communications equipment which allows the collar to connect to other devices or the internet.

The collar 100, 200 may further comprise sensors which detect indicators of animal health and behaviour. The exemplary collar of FIGS. 3 and 8 comprises sensors which detect body temperature, audio 290, and sleeping behaviours 285. A sensor which detects sleeping behaviours 285 may be an array of sensors which detect indicators of sleep, such as breathing rate, heart rate, and motion, or it may be a single sensor that detects a single indicator. The audio sensor 290 may be configured to detect only the growls produced by the wearing animal, or it may be configured to capture audio from the vicinity of the wearing animal. The collar 100, 200 may further include a body temperature sensor, which may be one or more electronic temperature sensors, such as a thermocouple. The readings from these sensors may be stored to memory within the collar, such as a replaceable memory card installed into a memory card slot 195, 295, or the readings may be sent to other devices using wireless communications equipment. Instead of or in addition to storing readings from the sensors, the sensors could be used by the collar to determine whether to change its state.

The collar 100, 200 may additionally have an auto standby mode, which keeps the collar in a standby state unless sensor readings suggest that the dog is at risk of being attacked. For example, an audio sensor 290 may detect growling, and instruct the collar to arm itself in response.

The collar firmware may be updated, either by connecting it to an electronic device which has access to a copy of the updated firmware, such as a laptop with internet access, using a cable or wireless technology, or by connecting the collar to the internet directly using a wired or wireless connection.

Collars in accordance with aspects of the invention may further comprise a camera 197, 297, which may be configured to record footage to memory on the collar, or to transmit footage to another device. In preferred embodiments the camera 197, 297 is a digital camera. If the collar comprises sensors as described above, the camera 197, 297 may be configured to begin recording automatically in response to sensor data. The camera 197, 297 may additionally or alternatively begin recording in response to instructions from a user. These instructions may be delivered by a signal from the remote control 300. The camera 197, 297 may also be configured to record continuously. The camera 197, 297 may be configured to overwrite the oldest footage stored in the memory that it writes footage to in order to make space for newer footage. The camera 197, 297 may record in a suitable resolution, such as 1280 by 720 ("HD"). The camera may have a large viewing angle, such as 180, to increase the chance that details of an important event. The camera may be mounted at a suitable position on the collar 100, 200, such as the electronics unit. Another suitable position on the collar 100, 200 is the position on the flexible strap 105, 205 which would be opposite the electronics unit 165, 265 when the collar is in a worn configuration, when worn by a typical dog. This may be two thirds of the length of the collar 100, 200 away from the buckle. The electronics unit 165, 265, being the heaviest portion of the collar 100, 200, is likely to rest at the lowest point of the wearing animal's neck, so the portion of the flexible strap 105, 205 opposite this portion is likely to rest at the highest point of the wearing animal's neck. This will give the camera 100, 200 a line of sight to both sides of the animal if the camera's viewing angle is sufficiently large.

Figure 5B:
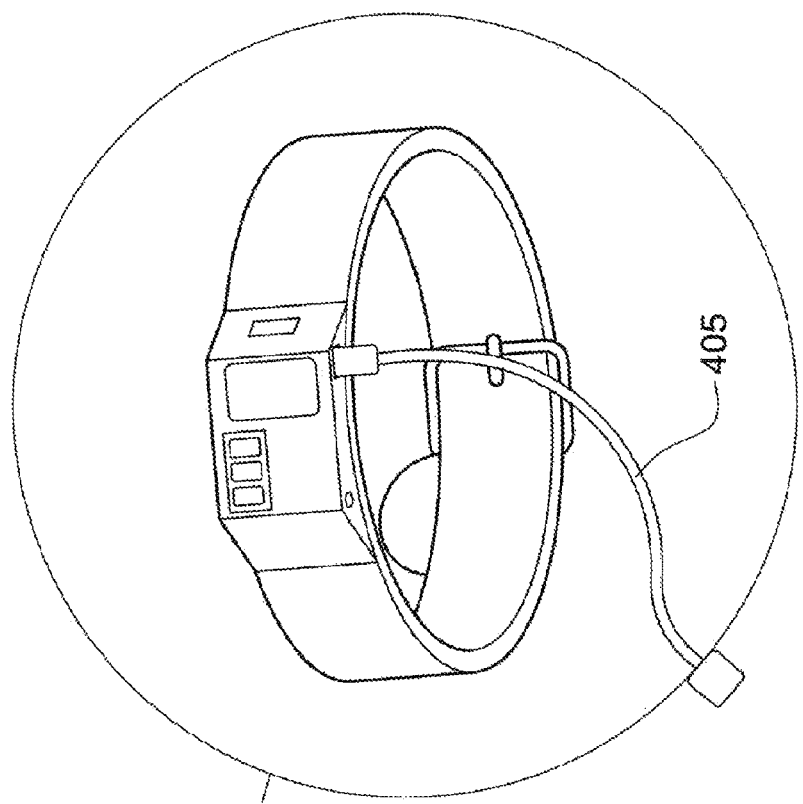
FIG. 5B shows a detailed view of the dog collar of FIG. 5A in accordance with the invention.
Figure 5A:
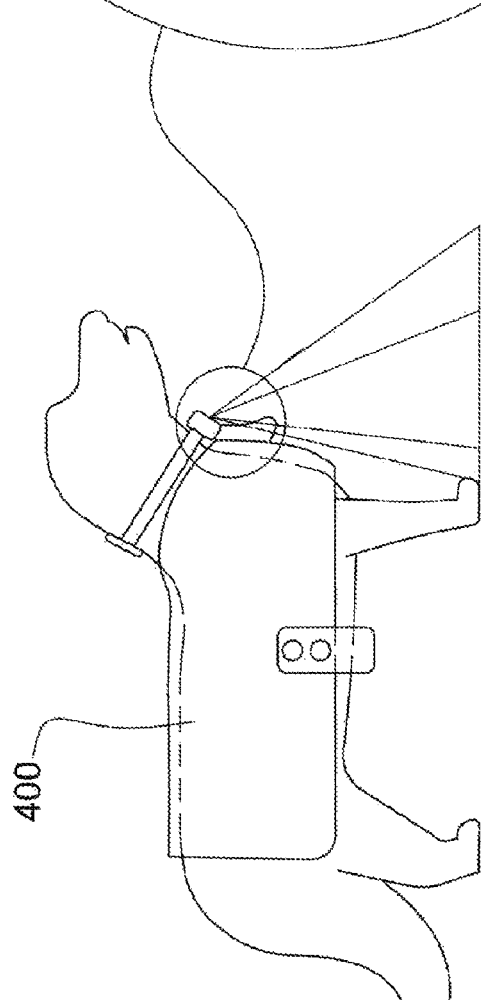
FIG. 5A shows a dog wearing dog clothing and a dog collar in accordance with the invention.
Figure 6:
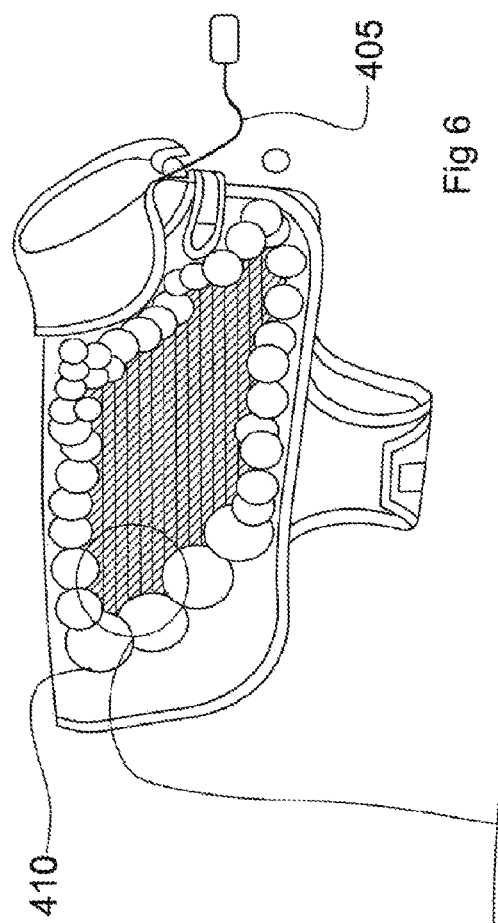
FIG. 6 is a side view of the dog clothing of FIGS. 5A and 5B, with a portion cut away to reveal the internal wiring arrangement of the clothing.

FIGS. 5A, 5B, and 6 show animal clothing 400, which embodies a further aspect of the invention. This animal clothing is attachable to a collar in accordance with previous aspects of the invention using a standard cable, such as a USB cable with a standard connector, attached at one end to the animal clothing and at the other end to a connector on the collar, such as the connector 155 or 255. The collar may additionally or alternatively be attached to the animal clothing 400 using a purpose-built cable or connector 405.

Figure 7:
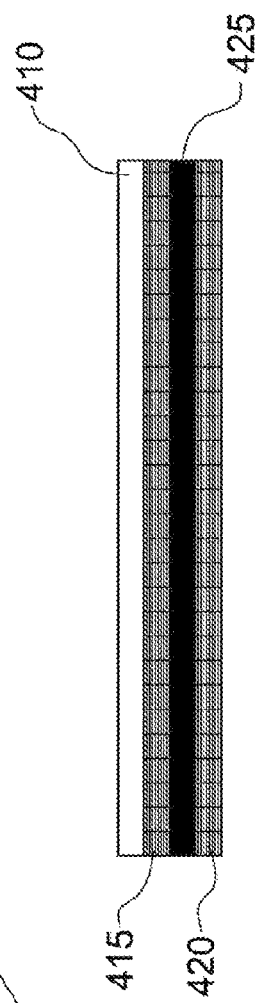
FIG. 7 is a cross sectional view of the material of the dog clothing of FIGS. 5A and 5B.

FIG. 7 shows a cross sectional view of the fabric of animal clothing 400. The surface layer 410 of this fabric may be formed from a non-conductive material, such as textiles formed from polymers or natural fibres, or other arrangements of polymers, or any other suitable material. A first conductive layer 415 is located beneath the surface layer 410, this may be formed from a flexible conductive layer, for example this layer may be formed from a mesh or weave of conductive wires, or a group of parallel conductive wires, or from conductive wires embedded in a layer of non-conductive material. Also located beneath the surface layer 410 is a second conductive layer 420. This second conductive layer 420 is insulated from the first conductive layer 415 by an inner non-conductive layer 425, which may be formed from materials also suitable for the surface layer. A potential difference may be maintained between each of the conductive layers, either by a power supply within the clothing, or by the power supply within the connected collar 100, 200. In the event of an attack an attempt to bite through the clothing 400 may result in both conductive layers 415, 420 being pierced, allowing current to flow through an attacking animal between the otherwise insulated conductive layers 415, 420, delivering a shock. The clothing 400 may be armed and disarmed at the same time as the collar as a result of the same instructions. This can be achieved simply by connecting each layer to a different terminal of the collar power supply, or by configuring the collar 100, 200 to communicate with and provide current to a dedicated clothing power supply.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A collar for an animal, the collar comprising:
   an electronics unit;
   a power supply operable to create a potential difference between a first and a second terminal;
   at least one flexible strap secured at one position along its length to the electronics unit,
      the at least one flexible strap having opposing ends which are releasably fastenable to each other to form a closed loop,
      the at least one flexible strap having an inner side and an opposed outer side, and
      the at least one flexible strap comprising first and second electrodes which are exposed or partially exposed on the outer side of the collar and are electrically connected to the first and second terminals of the power supply respectively; and
   a water sensor configured to detect the presence of water on the inner side of the collar and, if water is detected on the portion of the collar, cause the electronics unit to prevent the power supply from being operated to create a potential difference between the first and second electrodes;
   wherein the water sensor detects the presence of water by measuring the resistance between two electrical contacts; and
   wherein the two electrical contacts of the water sensor are positioned on the inner side of the collar.

2. The collar according to claim 1, wherein the power supply includes a rechargeable battery and the electronics unit includes a digital display which displays the remaining battery charge.

3. The collar according to claim 1, wherein the collar includes an LED.

4. The collar according to claim 3, wherein the LED is incorporated into the flexible strap.

5. The collar according to claim 3, wherein the LED is incorporated into the electronics unit.

6. The collar according to claim 3, wherein the LED is configured to generate light when the collar is in a standby mode.

7. The collar according to claim 3, wherein the LED is configured to flash when the power supply is generating a potential difference between the terminals.

8. The collar according to claim 3, wherein the LED is operable to be switched to a night light mode, in which the intensity of the light produced by the LED is increased.

9. The collar according to claim 8, wherein the light emitted by the LED in the night light mode is of a different colour than when operating in one or more other modes.

10. The collar according to claim 1, wherein the electronics unit includes a magnetic switch, which is configured to be used to switch the collar between a standby mode in which current is flowing through the electronics unit, and an "off" mode in which no current is flowing through the electronics unit.

11. The collar according to claim 1, wherein each terminal of the power supply is connected to the first and second electrodes in the flexible strap.

12. The collar according to claim 1, wherein the electronics unit also includes a disarm timer which causes the power supply to stop creating a potential difference between the first and second electrode once a configured time has elapsed after the power supply has begun to create a potential difference between the first and second electrode.

13. The collar according to claim 1, wherein the electronics unit contains the power supply.

14. An anti-attack system for an animal, the anti-attack system comprising:
   a collar according to any previous claim and further comprising a receiver; and
   a remote control comprising a transmitter operable to transmit a first signal;
   wherein upon receipt of a signal transmitted by the transmitter of the remote control by the receiver, the collar is configured to enter a state in which it creates a potential difference between the first and second electrodes, from a state in which it does not create a potential difference between the electrodes.

15. The anti-attack system according to claim 14, wherein the collar includes an LED that is operable to be switched to a night light mode, in which the intensity of the light produced by the LED is increased;
   wherein the remote control is further operable to transmit a second signal; and
   wherein, upon receipt of the second signal by the transmitter, the collar enters the night light mode if not in the night light mode, and leaves the night light mode if already in the night light mode.

16. The anti-attack system according to claim 14, wherein the power supply is operable to switch the potential difference being maintained between the terminals between a plurality of preconfigured potential differences.

17. The anti-attack system according to claim 16, wherein the collar is configured to cycle through the plurality of preconfigured potential differences between the electrodes while the collar is maintaining a non-zero potential difference between the first and second electrodes.

18. The anti-attack system according to claim 14, wherein the electronics unit includes a magnetic switch, which is used to switch the collar between a standby mode in which current is flowing through the electronics unit, and an "off" mode in which no current is flowing through the electronics unit; and
   wherein the remote controller further comprises a magnet suitable to change the state of the magnetic switch.

* * * * *